United States Patent [19]
Murakami et al.

[11] Patent Number: 5,838,245
[45] Date of Patent: Nov. 17, 1998

[54] CLEANING TIME DETERMINING DEVICE FOR DRUG STORAGE/DISCHARGE APPARATUS

[75] Inventors: Takaaki Murakami; Kunihiko Kano, both of Toyonaka, Japan

[73] Assignee: Kabushiki Kaisha Yuyama Seisakusho, Toyonaka, Japan

[21] Appl. No.: 787,293

[22] Filed: Jan. 24, 1997

[30] Foreign Application Priority Data

Jan. 26, 1996 [JP] Japan .................................. 8-011606

[51] Int. Cl.$^6$ .................................................. G08B 21/00
[52] U.S. Cl. .................... 340/674; 340/679; 340/815.74; 198/502.1; 221/2; 250/559.4; 356/240; 356/432
[58] Field of Search .................. 340/603, 627, 340/673, 675, 676, 674, 815.74, 630, 679; 250/559.4, 559.44, 559.45; 356/432, 433, 239, 240; 221/2; 198/502.1, 810.01

[56] References Cited

U.S. PATENT DOCUMENTS 4,866,425  9/1989  Landmark ............................... 340/630
5,295,571  3/1994  Van Den Bogaert et al. ...... 198/502.1

*Primary Examiner*—Daniel J. Wu
*Attorney, Agent, or Firm*—Wenderoth, Lind & Ponack, L.L.P.

[57] ABSTRACT

A drug storage/discharge apparatus having a cleaning time determining device which can detect dirt in drug discharge paths and determine when it is necessary to clean the discharge paths. A motor control circuit controls each feeder to discharge drugs from the feeder through its discharge opening. A light-emitting diode and a phototransistor are provided opposite to each other at the discharge opening. A drug discharged from the feeder intercepts the light from the light-emitting diode, thus fluctuating the output of the phototransistor. Based on the output fluctuation, the motor control circuit can confirm that a drug has been discharged. A low-pass filter is provided to apply only a low-frequency component of the output of the phototransistor to a comparator. Such low-frequency components represent to what degree the light-emitting diode and phototransitor are soiled. If the level of the low-frequency components drops below a reference voltage, the comparator produces a voltage Vh to indicate that the drug discharge paths have been soiled.

4 Claims, 9 Drawing Sheets

CLEANING TIME DETERMINING DEVICE FOR DRUG STORAGE/DISCHARGE APPARATUS

BACKGROUND OF THE INVENTION

This invention relates to a drug storage/discharge apparatus for storing drugs in feeders and discharging the drugs stored in the feeders in a controlled manner, and a cleaning time determining device used in the drug storage/discharge apparatus for detecting any dirt in the drug discharge paths and determining when to clean these paths.

FIG. 8 shows a conventional apparatus of this type. It comprises rotatably supported inner and outer annular plates 81, 82, and feeder columns 83 mounted on the respective annular plates 81 and 82 and arranged in two concentric circles. A drug guide path 84 extends vertically along each feeder column 83. A hopper 85 is provided under the annular plates 81 and 82. A drug packer (not shown) is provided under the hopper 85.

Each feeder column 83 comprises a plurality of feeders 86 vertically stacked one on another. FIG. 9 shows the detailed structure of a feeder 86. It comprises an outer case 87, an inner case 88 set in the outer case 87 and having a conical recess, a conical member 89 rotatably received in the inner case and having a gear 90 fixed to its bottom, and an intermittent motor 91 having an output shaft carrying a gear in mesh with the gear 90 to intermittently rotate the conical member 89. A plurality of grooves 92 are formed in the outer periphery of the conical member 89. A drug discharge opening 93 is formed in the bottom of the inner case 88.

With a plurality of drugs (such as tablets or capsules) put in the outer case 87 and the inner case 87 closed by a cover 94, the conical member 89 is intermittently rotated to guide the drugs one by one into each groove 92. By further intermittent rotation of the conical member 89, the drugs in the grooves 92, which are under the influence of centrifugal force, will be discharged one by one through the discharge opening 93 of the inner case 88 every time one of grooves 92 aligns with the opening 93.

A light-emitting diode 95 and a phototransistor 96 are provided opposite to each other in the discharge path of each feeder 86. The phototransistor 96 intercepts the light from the light-emitting diode 95. When each drug discharged from the discharge opening 93 passes between the elements 89 and 90, the light level intercepted by the phototransistor 96 drops momentarily, so that its output changes. From the change in output, it is possible to detect that one drug has been discharged.

Each drug discharged through the discharge opening 93 of each feeder 86 falls down a discharge path shown by arrow A into the drug guide path 84 and drops through the guide path 84 into the hopper 85.

The hopper 85 collects the drugs discharged from the feeders and guides them into the drug packer, which puts the drugs in pouches and seals the pouches.

While drugs are dropping through the drug guide paths 84, they may be abraded or chipped by touching the side walls of the guide paths 84 and their broken pieces or powder may stick to the side walls, thus polluting the side walls. This is not hygienically desirable.

Also, drugs dropping through the guide paths 84 may scrape off any dust and dirt stuck on the side walls of the guide paths. The dust and dirt scraped off will drop into the hopper 85 and eventually find their way into drug pouches. Such dust and dirt mixed into drug pouches not only discomfort patients but are potentially dangerous if such dust and dirt are broken pieces of drugs that must not be prescribed to a particular patient.

Powder dust originating from discharged drugs also soils the discharge opening 93 of each feeder 86 and its light-emitting diode 95 and phototransistor 96. This lowers the level of light intercepted by the phototransistor 96, narrowing the amplitude of fluctuations in output of the phototransistor 96 when a drug is discharged. Thus, it becomes difficult to detect discharged drugs and thus to dispense drugs with high accuracy.

It is therefore necessary to clean the drug discharge paths either periodically or when a machine operator thinks cleaning is necessary. But it is difficult to determine cleaning time or intervals because, for one thing, the degree to which the drug discharge paths is soiled varies widely according to the type of drugs used, and for another, it is impossible to see the discharge paths with the naked eye.

An object of this invention is to provide a cleaning time determining device for use in a drug storage/discharge apparatus which can detect dirt in the drug discharge paths and determine when to clean the discharge paths.

SUMMARY OF THE INVENTION

According to this invention, there is provided a cleaning time determining device for use in a drug storage/discharge apparatus having a plurality of feeders each keeping a plurality of drugs, the apparatus being adapted to discharge drugs from the respective feeders, collect and deliver them to a predetermined place, the cleaning time determining device comprising dirt detecting means provided in drug discharge paths leading from the respective feeders to a drug collecting station for detecting dirt in the drug discharge paths, and a display means for displaying the results of detection by the detecting means.

The dirt detecting means provided in the drug discharge paths, detect dirt in the drug discharge paths and a machine operator can thus determine if cleaning is necessary or when to clean by checking the results.

Each of the dirt detecting means may comprise a light emitter and a light interceptor provided opposite to each other in one of the drug discharge paths, and a comparator means for comparing the output of the light interceptor with a threshold to determine when to clean the one drug discharge path.

Such light emitter and light interceptor may also have the function of detecting that a drug has been discharged from each of the feeders.

Other features and objects of the present invention will become apparent from the following description made with reference to the accompanying drawings, in which:

DETAILED DESCRIPTION OF THE PREFERRED EMBODIMENT

Embodiments of this invention will now be described with reference to the accompanying drawings.

Figure 1:
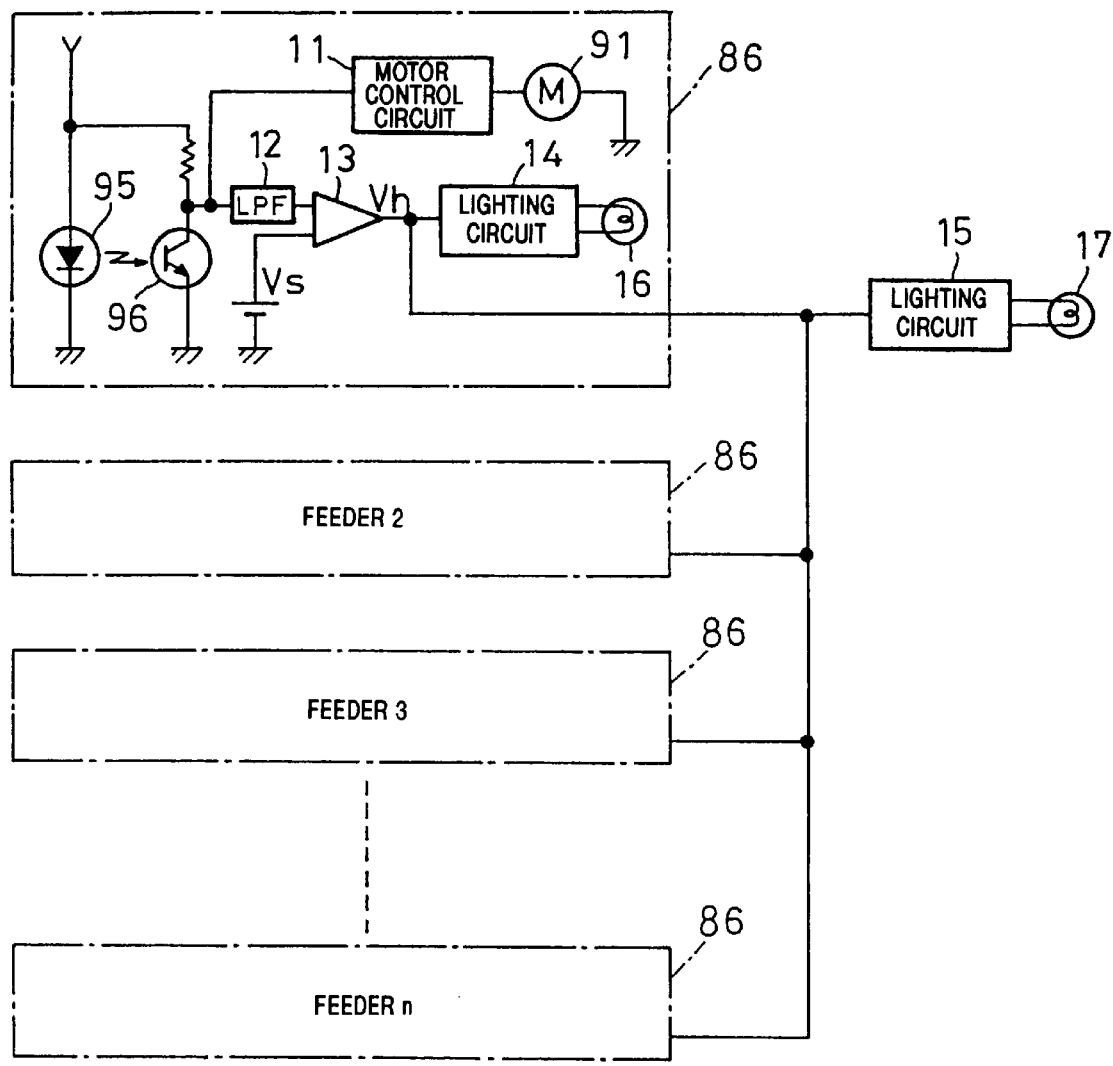
FIG. 1 is a block diagram of an embodiment of the cleaning time determining device according to this invention.
Figure 8:
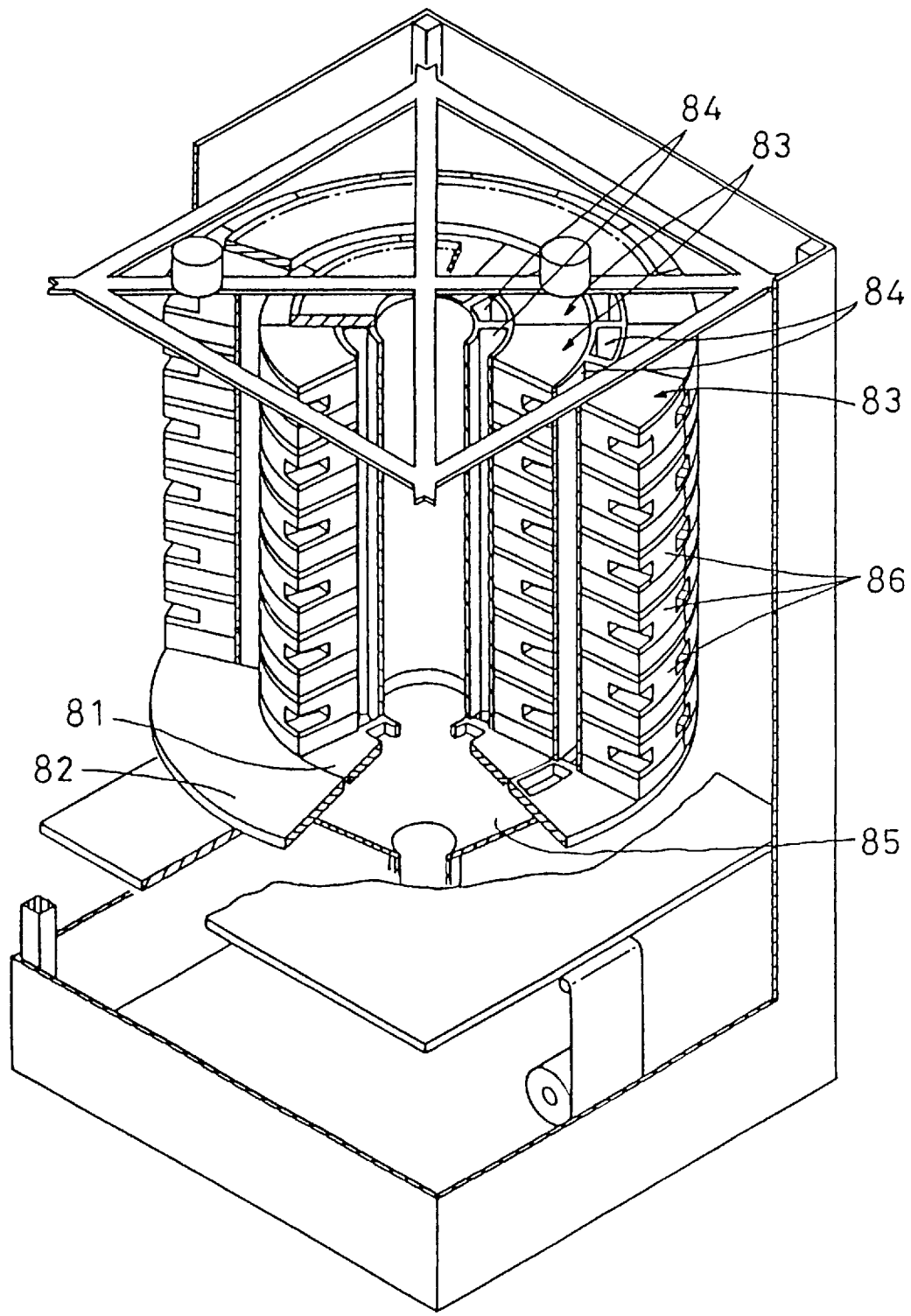
FIG. 8 is a perspective view of still another type of drug storage/discharge apparatus.

FIG. 1 shows an embodiment of the cleaning time determining device according to this invention. It is used for the drug storage/discharge apparatus shown in FIG. 8 to detect any dirt in the drug discharge paths and to determine when to clean these paths.

Figure 9:
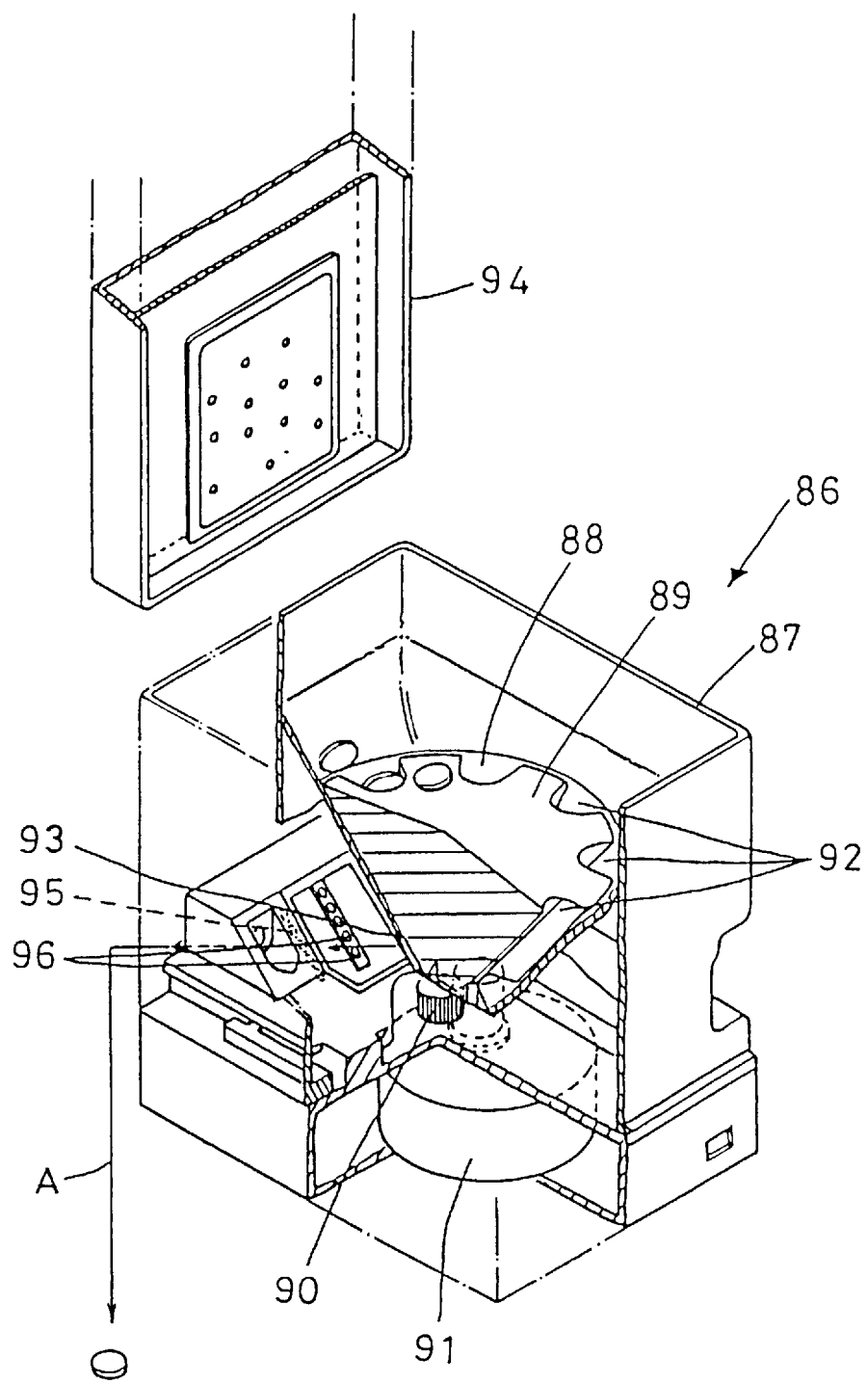
FIG. 9 is a perspective view of a feeder of the apparatus of FIG. 8.

The light-emitting diode 95 and the phototransistor 96 are provided opposite to each other in the discharge path of each feeder 86 shown in FIG. 9. In a normal state, the phototransistor 96 is kept on by receiving light from the light-emitting diode 95.

A motor control circuit 11 intermittently rotates the intermittent motor 91 of each feeder 86 in response to a command from a microprocessor (not shown) as a comprehensive control means of the entire apparatus. When the motor 91 is activated, one drug is discharged through the opening 93 of the inner case 88. The drug intercepts the light from the light-emitting diode 95, so that the output of the phototransistor 96 changes. If only one drug is to be discharged, the motor 91 is deactivated as soon as the output of the phototransistor 96 changes once. If a predetermined number (not one) of drugs are to be discharged, the motor 91 is kept activated until the number of changes in the output of the phototransistor 96 reaches the predetermined number, and then deactivated to discharge the predetermined number of drugs.

A low-pass filter 12 applies only low-frequency components of the output of phototransistor 96 to a comparator 13. Such low-frequency components contain no sharp fluctuations in the output of the phototransistor 96 resulting from the interception of light by discharged drugs but only gradual output fluctuations. That is, the level of such low-frequency components tends to drop gradually as the light-emitting surface and the light intercepting surface are soiled gradually by drugs charged from the feeder.

The comparator 13 compares the level of the low-frequency components from the phototransistor 96 with a threshold voltage Vs, and outputs a high-level voltage Vh if the former drops below the latter.

Such a high-level voltage Vh indicates that the light-emitting surface of the light-emitting diode 95 and the light intercepting surface of the phototransistor 96 are soiled to a predetermined degree. In such a case, it is highly probable that the drug guide path 84 corresponding to the particular feeder 86 is also soiled to the same degree.

The high-level voltage Vh produced by the comparator 13 is applied to lighting circuits 14 and 15. In response, the lighting circuit 14 turns on the second warning lamp 16 of the particular feeder 86, while the lighting circuit 15 turns on the first warning lamp 17 provided on the outer wall of the drug storage/discharge apparatus.

When the light-emitting diode 95 and the phototransistor 96 of a certain feeder 86 is soiled, the second warning lamp 16 of this feeder 86 and the first warning lamp 17 of the drug storage/discharge apparatus are turned on in the above manner. Thus, if the first warning lamp 17 turns on, the feeder 86 whose second warning lamp 16 is on is located, and its discharge opening 93, light-emitting diode 95 and phototransistor 96 are cleaned.

Then, the hopper 85 and packing unit are removed to clean the hopper 85 with a brush. Further, the drug guide path 84, of the feeder 86 whose second warning lamp 16 is on are fed is cleaned. The guide path 84 is cleaned by inserting a long brush into the path 84 and moving it up and down.

Figure 2:
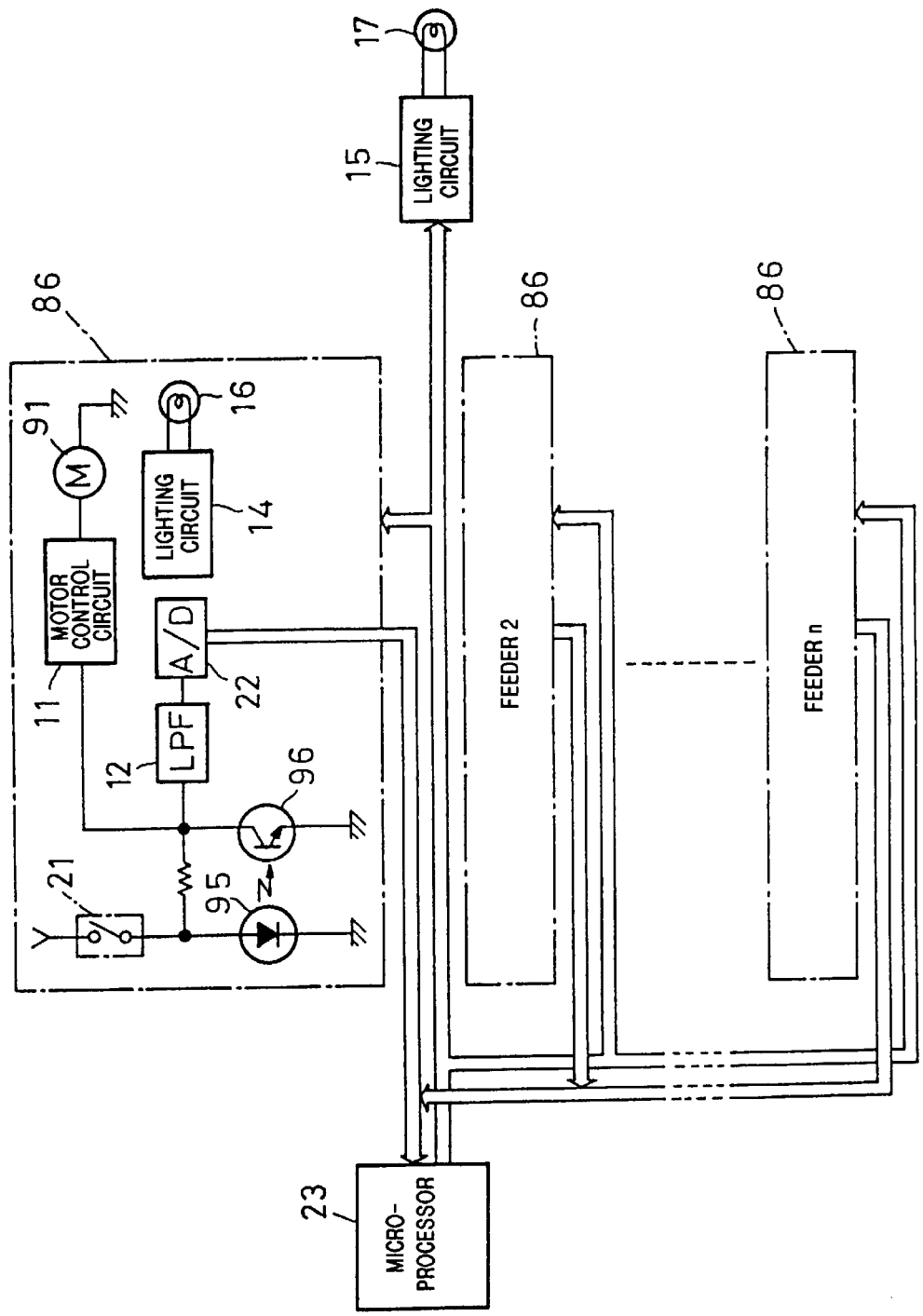
FIG. 2 is a block diagram of another embodiment.
Figure 3:
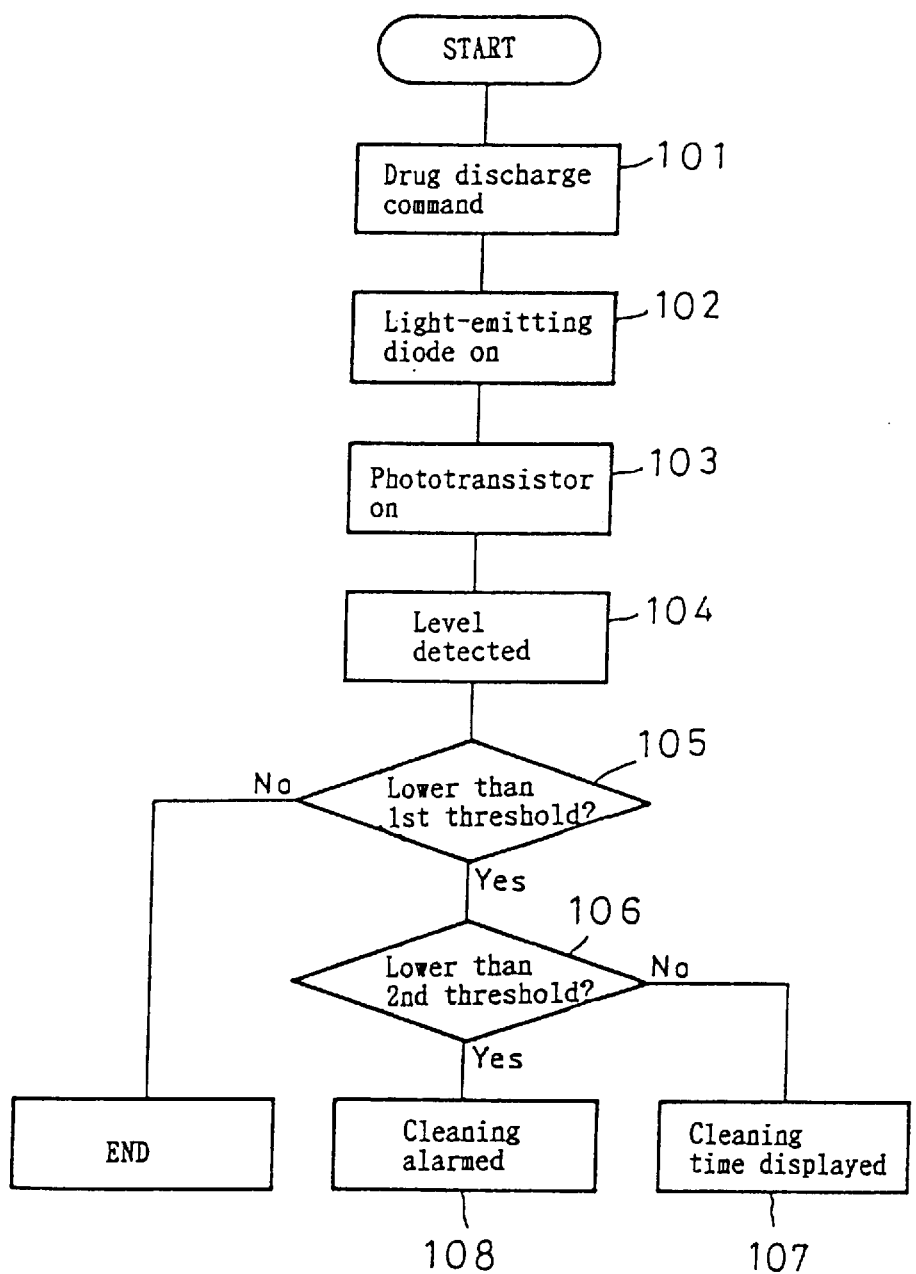
FIG. 3 is a flowchart showing steps carried out in the device of FIG. 2.

FIG. 2 shows another embodiment of the cleaning time determining device according to this invention. In this embodiment, an on-off switch 21 is series-connected to the light-emitting diode 95. Low-frequency components of the output of the phototransistor 96 are applied to an A/D converter 22, which converts the low-frequency components to digital signals. A microprocessor 23 as a comprehensive control means of the entire apparatus executes the steps shown in the flowchart of FIG. 3 to determine whether or not each feeder 86 has been soiled to a predetermined degree.

Specifically, when commands are inputted to discharge a predetermined number of drugs from a given feeder 86 (Step 101), the microprocessor 23 turns on the light-emitting diode 95 of this feeder 86 and activates the necessary parts of the feeder 86 to discharge drugs by the predetermined number.

Specifically, the microprocessor 23 closes the on-off switch 21 of the above particular feeder 86 to turn on the light-emitting diode 95 (Step 102), and activates the motor control circuit 11 to discharge drugs by the predetermined number by intermittently rotating the intermittent motor 91. The light emitted from the light-emitting diode 95 is intercepted by the phototransistor 96, and the low-frequency components of the output of the phototransistor 96 are inputted in the A/D converter 22, which converts the analogue low-frequency components to digital signals. The digital signals, which represent the level of the low-frequency components, are inputted in the microprocessor 23 (Step 104).

The microprocessor 23 then compares the level of the digital signals inputted with a first and a second threshold (Steps 105 and 106). If the level of the digital signals is lower than the first threshold (YES in Step 105) and higher than the second threshold (NO in Step 106), the microprocessor determines that the feeder 86 has been soiled to a certain degree, displays a message on CRT (not shown) to the effect that the particular feeder needs cleaning in a few days' time (Step 107), and stores the ID number of this particular feeder in the memory. If, on the other hand, the above level is lower than both the first and second thresholds (YES in both Steps 105 and 106), the microprocessor 23 determines that the feeder has been considerably soiled, turns on the second warning lamp 16 of the particular feeder 86 and the first warning lamp 17 of the drug storage/discharge apparatus, and displays on CRT a message to the effect that the guide path 84 through which drugs are discharged from the particular feeder 86 is fed and the hopper 85 have to be cleaned immediately (Step 108).

Figure 4:
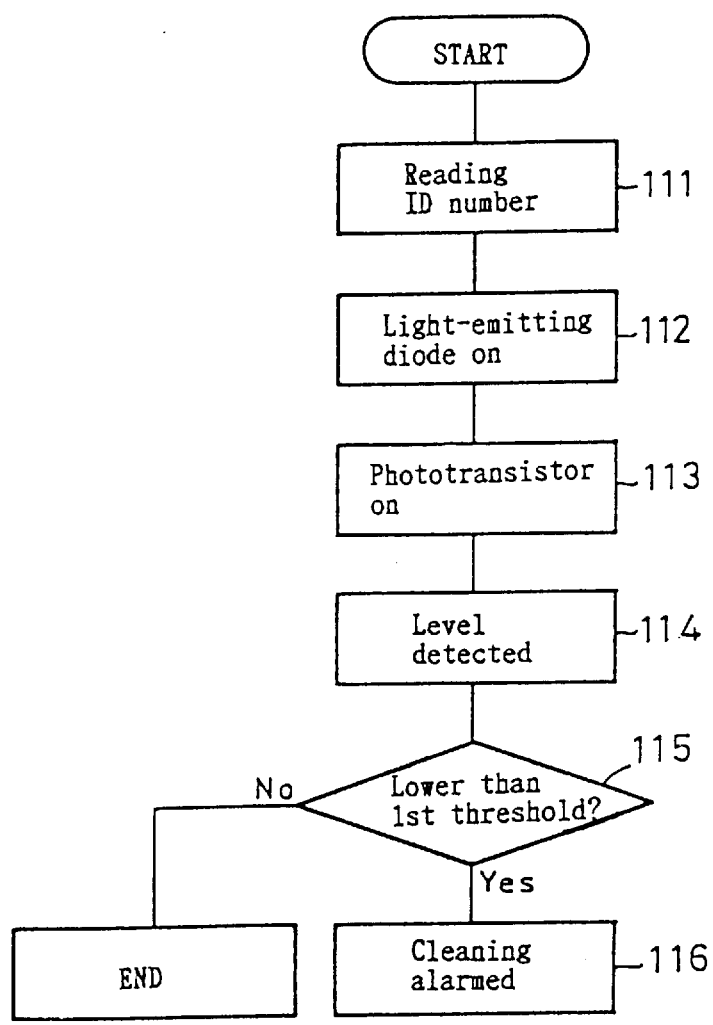
FIG. 4 is a flowchart showing other steps carried out in the device of FIG. 2.

If the microprocessor 23 determines that cleaning is needed in a few days' time in Step 107, the steps of the flowchart shown in FIG. 4 are carried out after waiting for a predetermined time period.

More particularly, the microprocessor 23 reads the ID number of the feeder 86 that has led to the execution of Step 107 (Step 111), and turns on the light-emitting diode 95 of this feeder 86 by closing the on-off switch 21 (step 112).

The light from the light-emitting diode 95 is intercepted by the phototransistor 96 (step 113). Low-frequency components of the light intercepted are inputted in the A/D converter 22 to produce digital signals that represent the level of the low-frequency components. The digital signals are fed to the microprocessor 23 (step 114).

The microprocessor 23 compares the level of the digital signals received with a first threshold (step 115). If the former is lower than the latter (YES in Step 115), the microprocessor turns on the second warning lamp 16 of the particular feeder 86 and the first warning lamp 17 of the drug storage/discharge apparatus (Step 116), and displays on CRT a message to the effect that the feeder 86, guide path 84 and hopper 85 have to be cleaned immediately (step 116).

Figure 5:
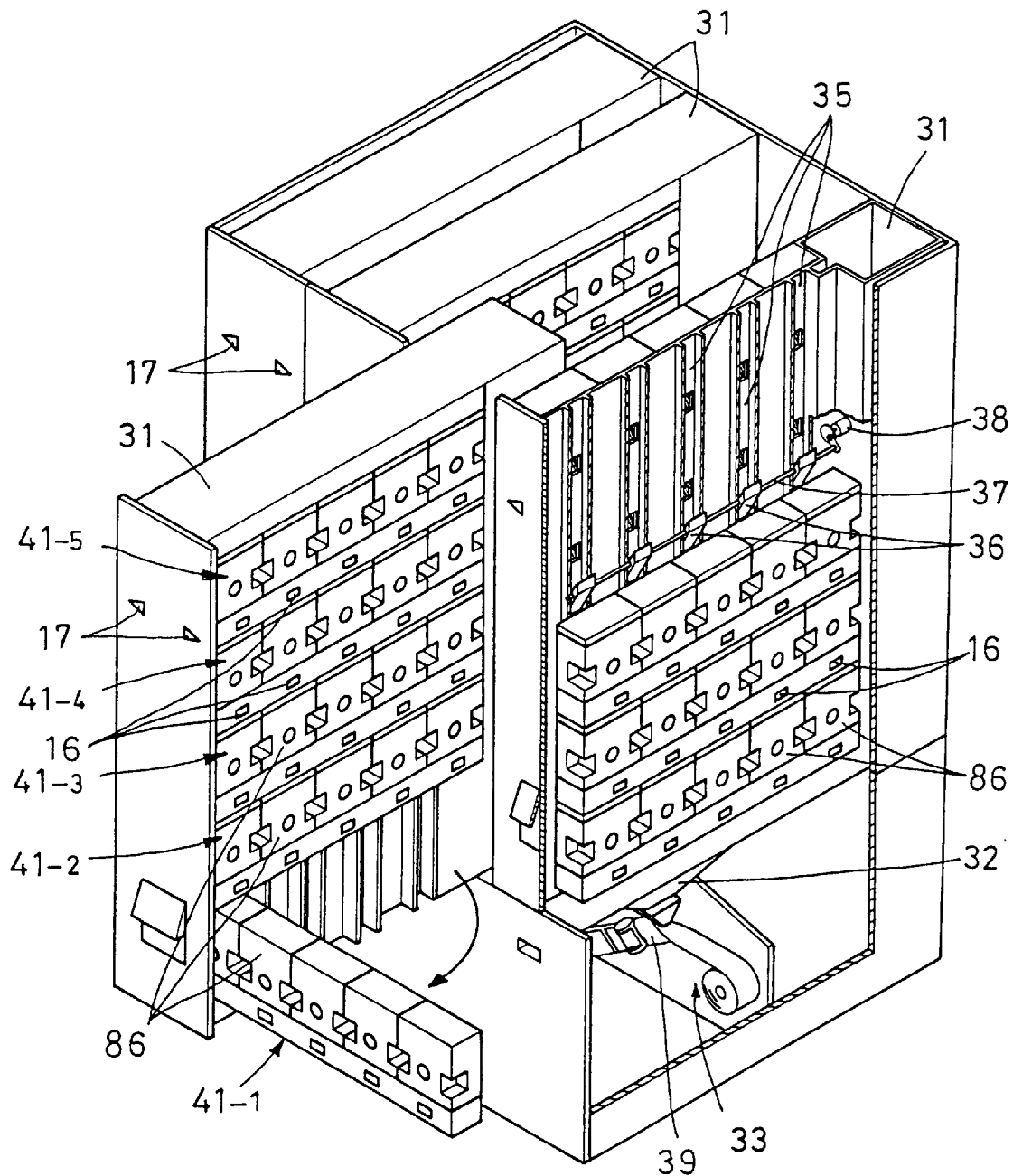
FIG. 5 is a perspective view of a drug storage/discharge apparatus in which the device of FIG. 1 or 2 is used.

FIG. 5 shows a different type of drug storage/discharge apparatus to which the cleaning time determining device of each of the above embodiments is applicable.

This apparatus comprises a plurality of drawer type feeder cabinets 31, and a hopper 32 and a packing unit 33 provided under the cabinets 31.

The cabinets 31 are supported on rails or rollers so as to be horizontally movable independently of one another. Each cabinet 31 supports a plurality of vertically arranged rows of feeders 86 of the type shown in FIG. 9. A drug guide path 35 extends vertically between each feeder column pair opposite to each other on both sides of each cabinet.

Shutter plates 36 are provided in the respective drug guide paths 35. They are supported on and coupled together by a horizontal shaft 37 extending a substantially central portion of each cabinet 31. The shaft 37 is connected to the output shaft of a motor 38, which can rotate the shaft 37 by 180° at a time to open and close the shutter plates 36. The shutter plates 36 are used to temporarily store drugs discharged from feeders located above the shutters and drop them at controlled intervals.

One or a plurality of drugs discharged from any feeder 86 drop through the respective guide path 35 into the hopper 32. They are then collected into a mass on the hopper 32 and dropped into a pouch 39. The pouch 39 is then closed by the packing unit 33 with at least one drug sealed therein.

Each cabinet 31 supports a plurality of vertically arranged, horizontal rows of feeders 86 on both sides thereof. Each of the feeder rows 41-1–41-5 consists of a plurality of feeders 86 coupled together and pivotally coupled at one end thereof to the cabinet 31 so as to be movable between an open position and a closed position. When in the closed position, one side of each feeder row 41-1–41-5 defines part of the side walls of the drug guide paths 35. By drawing out one cabinet 31 and opening the feeder rows 41-1–41-5 on one side of this cabinet 31, the guide paths 35 of this cabinet 31 can be accessed from this side.

One cleaning time determining device shown in FIG. 1 is provided on one side of each cabinet 31 of the above drug storage/discharge apparatus. That is, one first warning lamp 17 is attached to one side of each cabinet 31, and one second warning lamp 16 is provided on each feeder 86.

If the second warning lamp 16 of any feeder 86 is turned on, the first warning lamp 17 of the cabinet 31 to which this feeder 86 belongs is also turned on. Thus, it is possible to quickly find out any soiled feeder 86 by drawing out the cabinet 31 whose first warning lamp 17 is on and searching for the second warning lamp 16 that is illuminated.

Once the soiled feeder 86 is discovered, its discharge paths, light-emitting diode 95 and phototransistor 96 are cleaned. Also, the drug guide paths 35 of the particular cabinet 31 are exposed by opening the feeder rows 41-1–41-5 on one side of the cabinet to clean the guide path 35 through which drugs discharged from the particular feeder 86 are fed. Since the guide path is exposed, it is possible to easily clean it and also to visually check if the guide path has been cleaned sufficiently.

Figure 6:
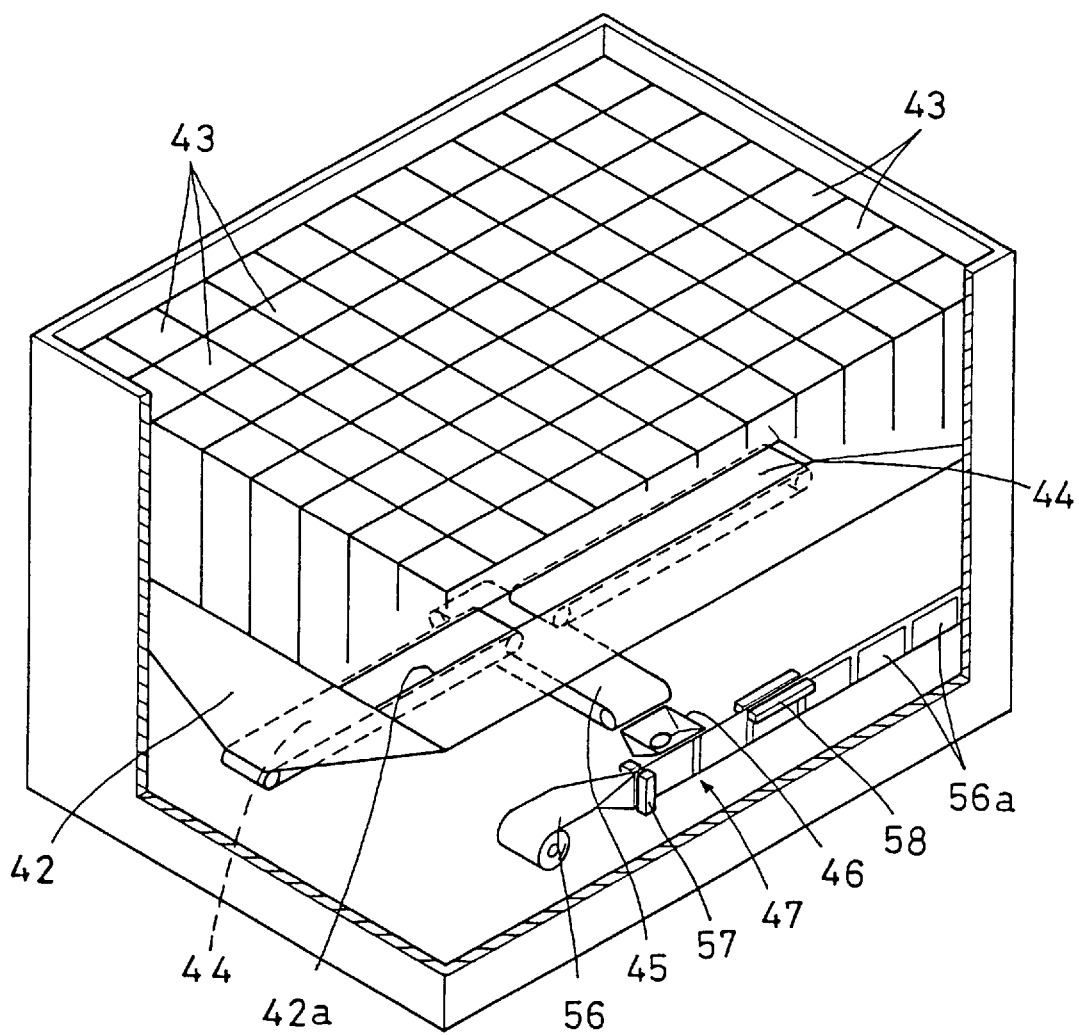
FIG. 6 is a perspective view of another drug storage/discharge apparatus in which the device of FIG. 1 or 2 can be used.

FIG. 6 shows a still different type of a drug storage/discharge apparatus to which the cleaning time determining device of each of the above embodiments is applicable.

This apparatus comprises a first hopper 42 having an elongated discharge opening 42a, feeders 43 provided over the first hopper 42, a pair of conveyors 44 provided under the discharge opening 42a, a second conveyor 45 provided under the clearance between the first conveyors 44, a second hopper 46 provided at one end of the second conveyor 45, and a packing unit 47 provided under the second hopper 46.

Figure 7:
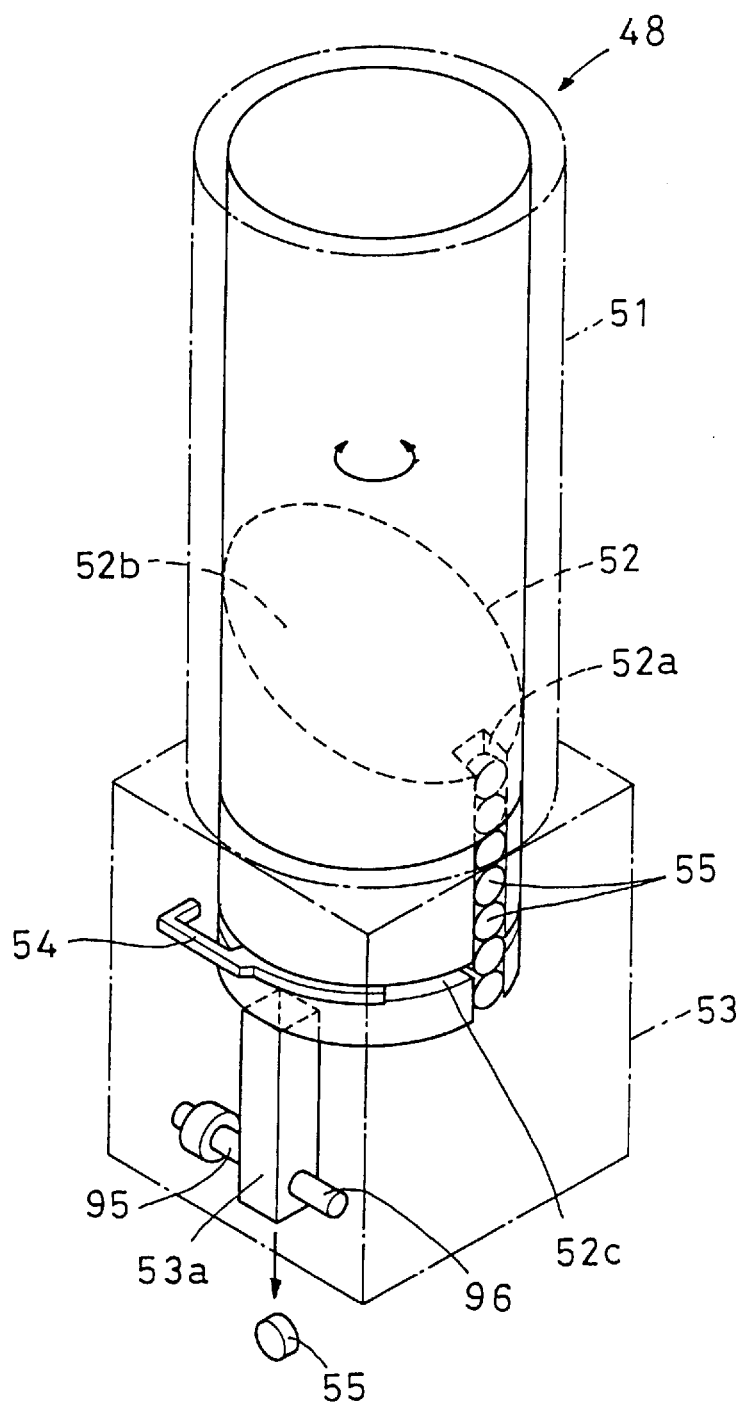
FIG. 7 is a perspective view of a feeder of the apparatus of FIG. 6.

As shown in FIG. 7, each feeder 43 has a cylindrical case 51 and a rotor 52 inserted in the case 51 from its bottom and rotated by a motor (not shown) mounted in a base 53. The rotor 52 has a slanted top surface 52b and is formed with a vertical groove 52a and a horizontal annular groove 52c in its cylindrical periphery. A separating spring 54 fits in the annular groove 52c. The base 53 has a drug discharge opening 53a. A light-emitting diode 95 and a phototransistor 96 similar to those shown in FIG. 1 are provided opposite to each other across the opening 53a.

The rotor 52 is rotated with a large number of drugs put in the cylindrical case 51 to guide the drugs 55 into the vertical groove 52a. As the rotor 52 rotates, the vertical groove 52a moves toward the separating spring 54. When the spring 54 is inserted into the groove 52a, the lowest one of the drugs 55 in the groove 52a is separated from the upper drugs by the spring 54. The single drug 55 thus separated drops through the discharge opening 53a into the first hopper.

While the drug is dropping through the discharge opening 53a, it intercepts the light from the LED, so that the level of the light reaching the phototransistor 96 drops momentarily. It is thus possible to detect that the drug has been discharged based on the change in output of the phototransistor 96.

Drugs 55 discharged one by one from each feeder 48 in the above manner drop into the first hopper 42. They are then collected onto the first conveyors 44, conveyed to their delivery ends located over the second conveyor 45, dropped onto the second conveyor 45, carried toward the second hopper 46, dropped into the second hopper 46 and then into the packing unit 47. In the packing unit 47, the drugs are put in a plurality of series-connected pouches 56a formed by folding a sheet material 56 in two and heat-sealing it vertically at predetermined intervals with a vertical heat sealer 57. When drugs are put in each pouch 56a, its to
edge is closed by a horizontal heat sealer 58.

This drug storage/discharge apparatus is provided with a cleaning time determining device of the type shown in FIG. 1. That is, a second warning lamp 16 is provided on the top of each feeder 43 and a first warning lamp 17 is provided on the outer wall of the drug storage/discharge apparatus.

If the first warning lamp 17 is turned on, the feeder 43 whose second warning lamp 16 is on is searched, and once found out, the discharge opening 53a of this feeder 43 and its light-emitting diode 95 and phototransistor 96 are cleaned. The first hopper 42, first conveyors 44, second conveyor 45 and second hopper 46 are also cleaned.

This invention is not limited to the above-described particular embodiments but is susceptible to various modifications. For example, instead of providing each feeder with a light-emitting diodes and phototransistor, similar light-emitting diode and a phototransistors may be provided in the drug feed paths including the drug guide paths and hoppers. Light-emitting elements and light-intercepting elements other than light-emitting diodes and phototransistors may be used. Also, instead of such optical detecting means, electric detecting means such as capacitors, inductors and resistors may be used to determine the cleaning time by detecting electrical changes with these electric elements. Also, the cleaning time may be determined based on pictures of the drug discharge paths taken by image-pickup means.

As described, according to this invention, the dirt detecting means detects any dirt in the drug discharge paths and displays the results. A machine operator can thus determine if cleaning is necessary or when to clean by checking the results.

What is claimed is:

1. A drug storage/discharge apparatus comprising:
    a plurality of drug feeders for storing and feeding drugs;
    a plurality of drug guide paths extending along said drug feeders for guiding drugs discharged therefrom, wherein said drug discharge paths are exposable to permit cleaning and visual inspection thereof;
    a drug collecting station for receiving drugs fed from said drug feeders through said drug guide paths;
    a dirt detector, provided in each said drug discharge paths leading from said drug feeders to said drug collecting station, for detecting dirt present in said drug discharge paths; and
    a display device for displaying detection results from said dirt detector.

2. The drug storage/discharge apparatus as claimed in claim 1, wherein each of said dirt detectors comprises:
    a light emitter provided in one of said drug discharge paths;
    a light interceptor provided in said one discharge path in a location which is opposite from said light emitter; and
    a comparator for comparing an output from said light interceptor with a threshold value in order to determine whether it is necessary to clean said one drug discharge path.

3. The drug storage/discharge apparatus as claimed in claim 2, wherein said light emitter and said light interceptor in said one discharge path also function to detect that a drug has been discharged from each of said feeders disposed along said drug discharge path.

4. The drug storage/discharge apparatus as claimed in claim 3, wherein each of said dirt detectors further comprises a low-pass filter for applying only low-frequency components of the light interceptor output to said comparator.

* * * * *